US007658353B2

(12) United States Patent
Ford

(10) Patent No.: US 7,658,353 B2
(45) Date of Patent: Feb. 9, 2010

(54) ADJUSTABLE SUPPORTS FOR MOUNTING A PLANAR OBJECT BETWEEN OPPOSED SURFACES

(76) Inventor: Larry Ford, 10635 Park Place Dr., Seminole, FL (US) 33778

( * ) Notice: Subject to any disclaimer, the term of this patent is extended or adjusted under 35 U.S.C. 154(b) by 316 days.

(21) Appl. No.: 11/748,945

(22) Filed: May 15, 2007

(65) Prior Publication Data

US 2007/0241245 A1 Oct. 18, 2007

Related U.S. Application Data

(63) Continuation-in-part of application No. 11/406,417, filed on Apr. 18, 2006.

(51) Int. Cl.
*F16M 11/00* (2006.01)

(52) U.S. Cl. ............... 248/201; 248/231.41; 248/228.5; 248/276.1; 248/292.12; 248/229.11; 248/229.12; 269/137

(58) Field of Classification Search ............. 248/200.1, 248/228.3, 228.1, 228.2, 228.5, 231.41, 276.1, 248/292.12, 292.11, 229.12, 201; 267/137, 267/195; 182/36; 24/580; 269/137, 195
See application file for complete search history.

(56) References Cited

U.S. PATENT DOCUMENTS 1,760,346 A 5/1930 Correa
2,548,248 A * 4/1951 Wiebe ........................ 242/580
2,552,738 A * 5/1951 Renner ....................... 269/194
4,805,889 A * 2/1989 Liepse ........................ 269/210
5,324,013 A * 6/1994 Marino ....................... 269/137
5,634,618 A * 6/1997 Farmer et al. ............... 248/201
6,076,633 A * 6/2000 Whitmer ...................... 182/36
6,126,158 A 10/2000 Engibarov
7,533,751 B2 * 5/2009 Handa et al. ................ 180/210

* cited by examiner

*Primary Examiner*—J. Allen Shriver
*Assistant Examiner*—Todd M. Epps
(74) *Attorney, Agent, or Firm*—Larson & Larson, P.A.; Frank Liebenow

(57) ABSTRACT

The present invention is an adjustable support for installing a planar sheet of material between opposed surfaces for protection from events such as storms. The supports secure the planar sheet to an opening such as a door and window, thereby holding it in place during storms, etc. The supports are easily removed and include a substantially L-shaped base and a clamp. The clamp is removably and adjustably attached to the first side of the L-shaped base, thereby forming an aperture between the second side of the L-shaped base and the bottom surface of the clamp. The aperture is adaptable to accept various thicknesses of substantially planar objects. A device is provided for engaging the adjustable support with a support structure, passing through the clamp and passing through a hole in the first side of the L-shaped base and interfacing with support surfaces to hold the substantially planar object between the first support surface and a substantially opposed second support surface.

12 Claims, 7 Drawing Sheets

ADJUSTABLE SUPPORTS FOR MOUNTING A PLANAR OBJECT BETWEEN OPPOSED SURFACES

CROSS-REFERENCE TO RELATED APPLICATIONS

This is a continuation-in-part of U.S. patent application Ser. No. 11/406,417, filed on Apr. 18, 2006, which is incorporated by reference into this application.

FIELD OF THE INVENTION

This invention relates to the field of supports and more particularly to an adjustable support device for mounting a planar object between two opposing surfaces.

BACKGROUND OF THE INVENTION

In hurricane-prone areas or possibly tornado-prone areas, often when advance notice is provided, windows and doors get covered with plywood to reduce penetration by wind and flying debris. In the past, the plywood was screwed or nailed to the door or window frame and removed when the storm resided. The process of holding the plywood in place and nailing or screwing it to the frame is time-consuming and often required one person to hold the plywood while another person fastens the plywood to the window or door frame. Unfortunately, the screws leave holes where they entered the frame. Even worse, if not pre-drilled, the nails or screws sometimes crack the frame.

An improvement to the process of mounting plywood to the door or window frame is described in U.S. Pat. No. 5,634,618 to Farmer, Jr. et al., which is hereby incorporated by reference. This patent describes an adjustable clip for mounting the plywood between two opposing surfaces (e.g., the inner side surfaces of the door or window frame). The clip described in this patent has a U-shaped "cup" portion into which the plywood fits and a means to apply force to the opposing surfaces which, in one embodiment, is a screw. Unfortunately, this clip is not suitable for a range of materials, being designed to fit only one size of material (e.g., ¼" plywood). This requires installers to carry different clips for different sizes of plywood or similar material (e.g., ¼" plywood, ⅜" plywood, ½" plywood, 10 mm plastic). Furthermore, after the storm, if plywood is used, it often absorbs moisture. The plywood swells from the moisture and may not fit in the U-shaped cup of this patent.

What is needed is an adjustable clip or support that fits many different thicknesses of planar material such as plywood while holding the planar material against the inner surfaces of a window or door frame during situations such as severe weather.

SUMMARY OF THE INVENTION

In one embodiment, an adjustable support for mounting a substantially planar object between substantially opposed support surfaces is disclosed including a substantially L-shaped base and a clamp. The clamp is removably and adjustably attached to the first side of the L-shaped base, thereby forming an aperture between the second side of the L-shaped base and the bottom surface of the clamp. The aperture is adaptable to accept various thicknesses of substantially planar objects. A device is provided for engaging the adjustable support with a support structure, passing through the clamp and passing through a hole in the first side of the L-shaped base and entering a hole in the support surface to hold the substantially planar object between the first support surface and a substantially opposed second support surface.

In another embodiment, a system for protecting an opening is disclosed; the opening has substantially opposed support surfaces. The system includes a substantially planar object sized to fit snuggly within the opening between a first and second opposing support surface. The system includes holes formed in the opposing support surfaces. A plurality of adjustable supports hold the planar object within the opening; each the adjustable supports includes a substantially L-shaped base having and a clamp. The clamp is removably and adjustably attached to a first side of the L-shaped base thereby forming an aperture between a second side of the L-shaped base and a bottom surface of the clamp. The aperture accepts and holds planar object of various widths. A locking pin passes through each clamp and through an elongated hole in the first side of the L-shaped base. The locking pin inserts into the holes in the substantially opposed support surfaces, thereby holding the substantially planar object within the opening.

In another embodiment, an adjustable support for mounting a substantially planar object between substantially opposed support surfaces is disclosed including a substantially L-shaped base and a clamp. The clamp is removably and adjustably attached to a first side of the L-shaped base forming an aperture between a second side of the L-shaped base and a bottom surface of the clamp. The aperture accepts and holds the planar object. A device for securing the adjustable support to the substantially opposed support surfaces passes through the clamp and through an elongated hole in the first side of the L-shaped base and interfaces with the substantially opposed support surfaces thereby holding the substantially planar object between the substantially opposed second support surfaces.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Figure 1:
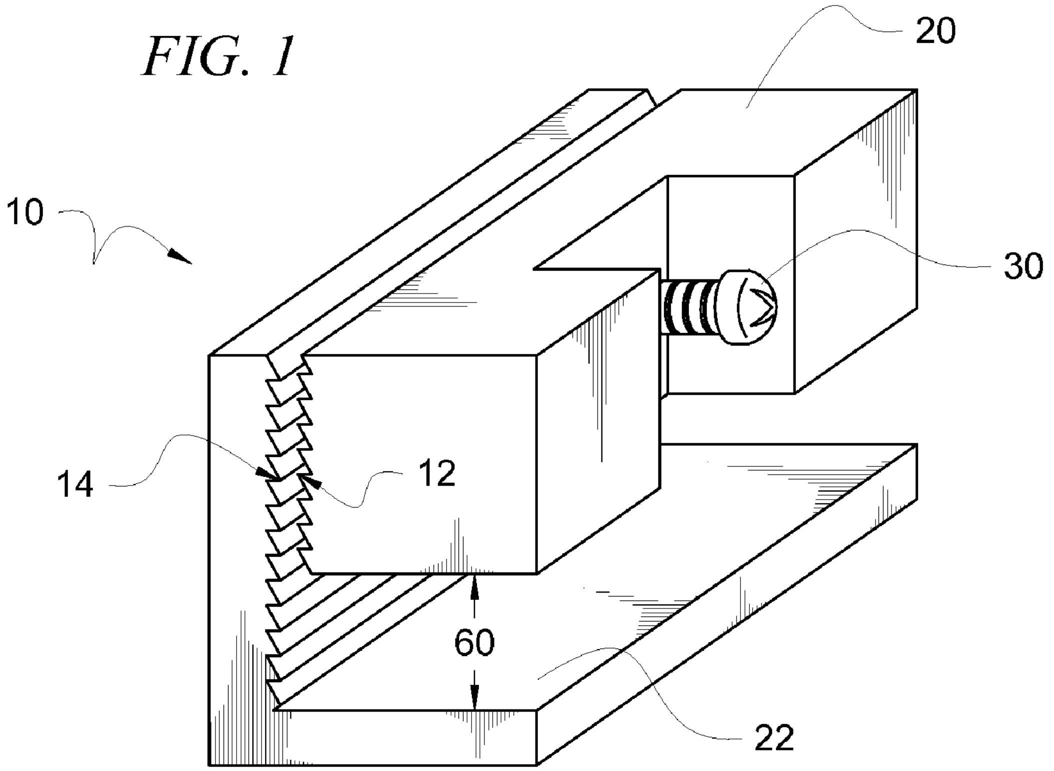
FIG. 1 illustrates a perspective view of a support of the present invention.

Reference will now be made in detail to the presently preferred embodiments of the invention, examples of which are illustrated in the accompanying drawings. Throughout the following detailed description, the same reference numerals refer to the same elements in all figures. The support of the present invention is designed to hold in place any conceivable stiff, planar object including wood (e.g., plywood), composite material, plastic (e.g., clear polycarbonate panels or polypropylene panels), glass and metal (e.g., aluminum and galvanize steel). Furthermore, the planar material can be corrugated or accordion style. If corrugated or accordion style, the support of the present invention is preferably deployed at locations along the structural sides of the planar material such that as force is applied, it forms a wedge instead of compressing the corrugations or accordion folds. The support of the present invention holds this planar object securely between two substantially opposed support surfaces by applying traverse pressure between at least one of the support surfaces and the planar object. The support surfaces can be any substantially opposed surface including, but not limited to, two parallel sides of a door frame or window frame.

As will be seen, the adjustable supports of the present invention provide an adjustable aperture that can accept and hold a wide range of thicknesses of planar material allowing an installer to need only one type of support for installation of many types of planer material. For example, sheet steel may have a thickness of ¼" while plywood or polycarbonate panels may have a thickness of ¾". The supports of the present invention can be adjusted to work equally well with both thicknesses of planar material. Furthermore, often after the storm subsides, the planar material is removed from the structure being protected. If the planar material accepts moisture and expands (e.g., plywood), it is important that the supports adjust to the slightly thicker, off-tolerance planar material. This would not be easy to do with the supports of the prior art.

Referring to FIG. 1, a perspective view of an adjustable support of the present invention is shown. An L-shaped base 22 and clamp 20 are configured to sandwich a planar sheet of material 40 (shown in FIG. 4) in an aperture 60. In a preferred embodiment, base serrations 14 catch and hold clamp serrations 12, holding the clamp against the planar sheet of material 40 until screws 24 (shown in FIG. 3) are inserted and tightened. The base serrations 14 are angled toward the base 22 bottom while the clamp serrations 12 are angled away from the base 22 bottom, thereby engaging with each other to hold the clamp 20 in position with respect to the base 22 while inserting and tightening screws 24 (shown in FIG. 3) creating an aperture 60 of desired size. The pressure screw 30 is threaded in preferably the clamp 20 or alternately the base 22 and is tightened to apply pressure against two opposing support surfaces in between which the planar sheet 40 has been inserted as will be shown in FIG. 4. The two opposing support surfaces are, for example, the inner walls of a door frame or the inner walls of a window frame.

The L-shaped base 22 and clamp 20 are made from any sturdy material, preferably aluminum, steel, stainless steel, ultra-high molecular weight plastic (UHMW) or a structural plastic such as glass-filled polypropylene.

Figure 2:
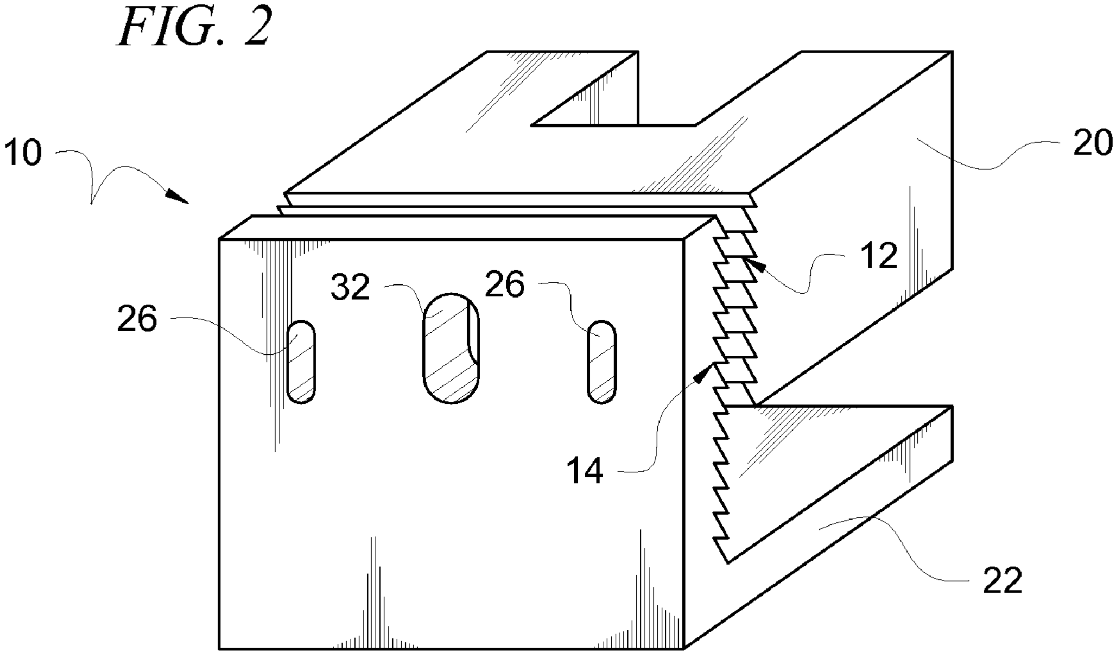
FIG. 2 illustrates a rear perspective view of a support of the present invention.

Referring to FIG. 2, a rear perspective view of an adjustable support of the present invention is shown. Shown is the base 22 with elongated screw holes 26 through which clamp screws 24 (shown in FIG. 3) pass and another elongated screw hole 32 through which the pressure screw 30 passes. The elongated screw holes 24/32 allow movement of the clamp 20 with respect to the base 22. In this embodiment, serrations 12/14 hold the clamp 20 in place with respect to the base 22 while tightening clamp screws 24, thereby locking the clamp 20 in position with respect to the base 22. The serrations also provide structural locking between the clamp 20 and the base 22.

Figure 3:
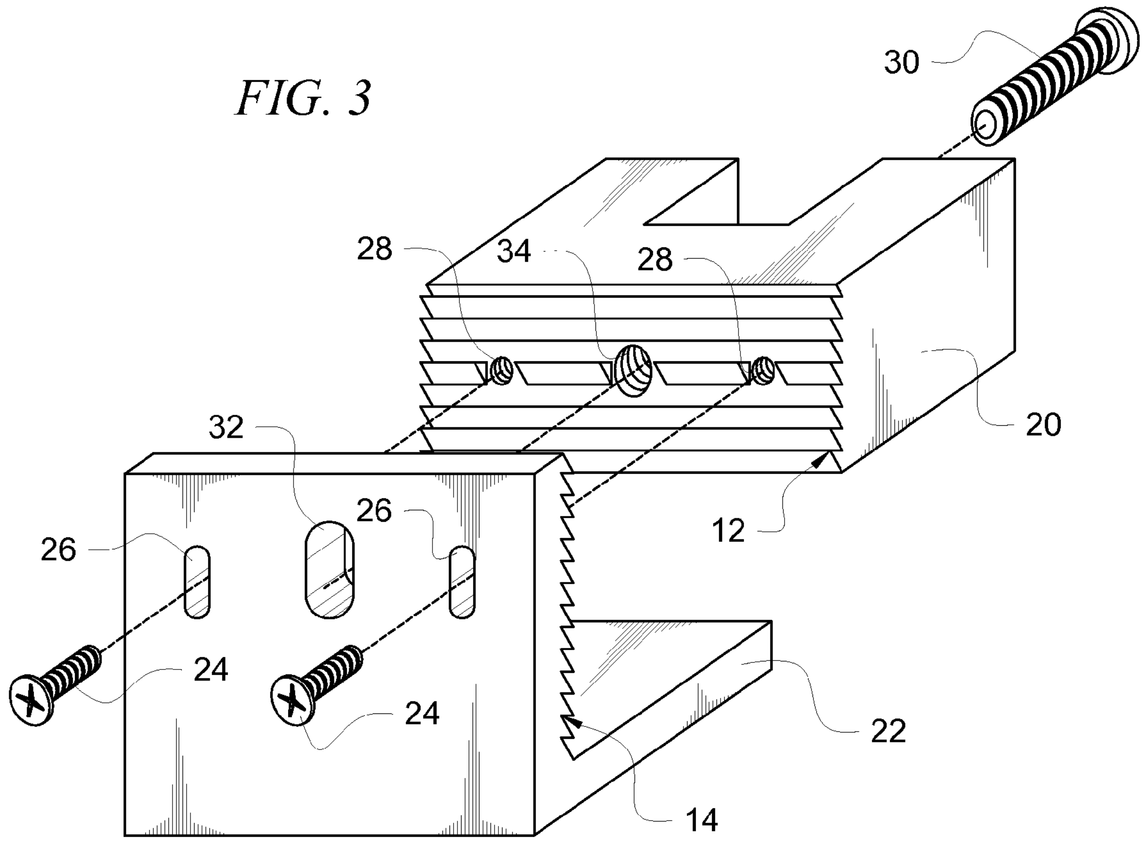
FIG. 3 illustrates an exploded view of a support of the present invention.

Referring to FIG. 3, an exploded view of an adjustable support of the present invention is shown. Shown is the base 22 with the optional serrations 14 visible from the side only. The optional serrations 12 of the clamp 20 are visible. The pressure screw 30 threads through threads 34 in the clamp 20 and passes through an elongated hole 32 in the base 22, thereby permitting the clamp 20 to move closer to the base 22 to tightly hold the planar material 40 (not shown). Likewise, clamp screws 24 pass through the elongated holes 26 in the base and into threaded holes 28 in the clamp. The clamp screws 24 hold the clamp 20 and base 22 in relative position after they are adjusted to the desired aperture size.

Figure 4:
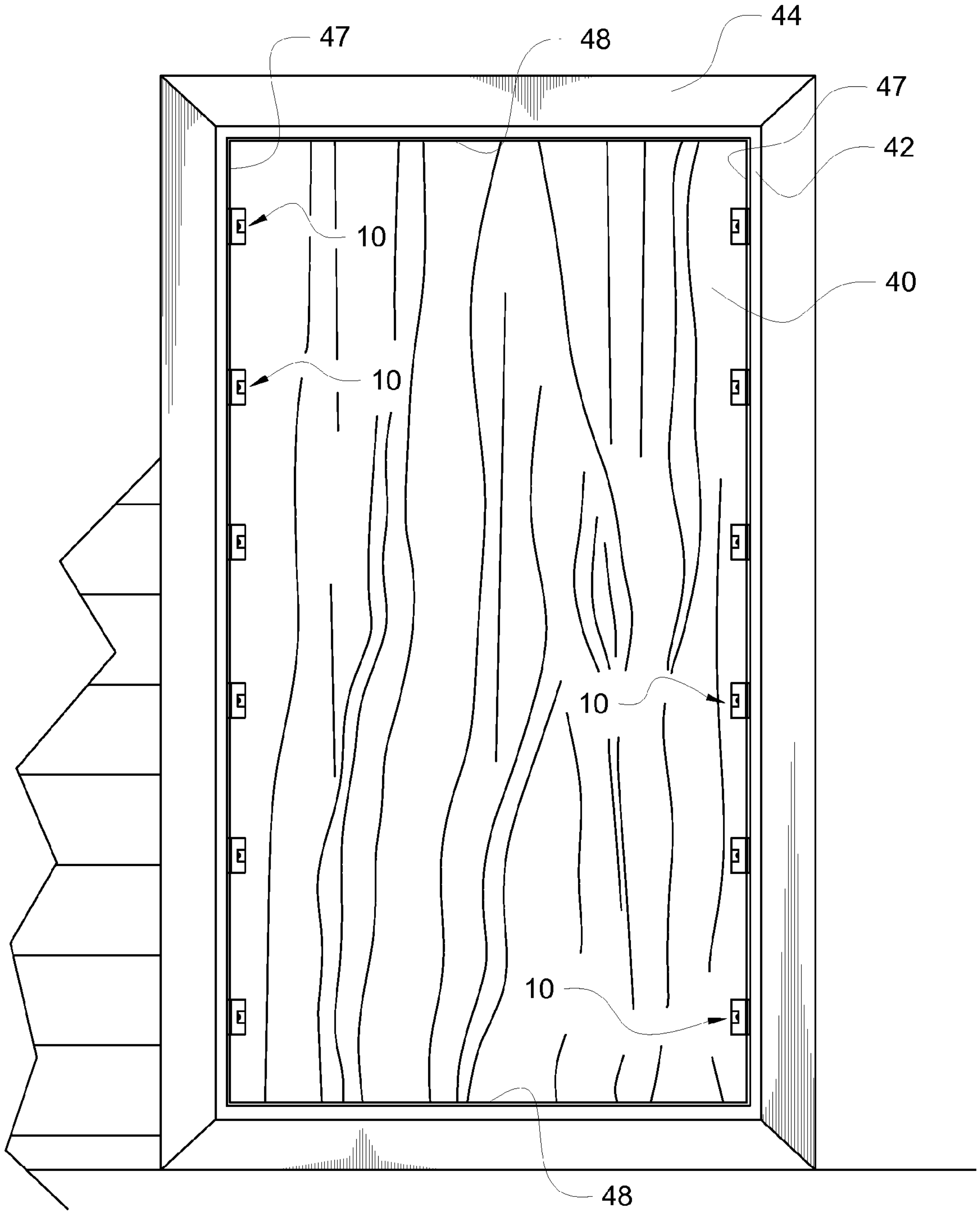
FIG. 4 illustrates a view of a door shielded by a planar sheet of material held in place by multiple supports of the present invention.

Referring to FIG. 4, a view of a door shielded by a planar sheet of material held in place by multiple adjustable supports of the present invention is shown. The door is by example. Any opening can be protected with the present invention including, but not limited to, a door and a window. The door has a frame with decorative molding 44. In this example, a sheet of plywood is fitted within the inside edges of the door frame 47/48 and a plurality of supports 10 of the present invention are situated holding the plywood 40 between the clamp 20 and base 22 of the supports 10 and the supports 10 apply pressure to the opposing inside edges of the door frame 47/48 by tightening the pressure screws 30 of each support 10. As shown, supports are positioned on opposite edges of the planar material 40, which can be any relatively flat and stiff material such as plywood, etc. It is preferred to place the supports 10 at 6 inches from the edge of the planar material 40 and at every 12 inches thereafter. For added strength, supports 10 can be placed on the top and bottom edges of the planar material 40, thereby exerting pressure on the top and bottom inside walls 48 of the frame 42. In another embodiment, supports 10 are placed along only one edge of the planar material 40. For additional protection, the pressure screw 30 can have a protective cup on its end where it interfaces with the door frame 47/48 or a thin sheet of a stiff material such as steel can be placed between the end of the pressure screw 30 and the opposed surfaces.

Figure 5:
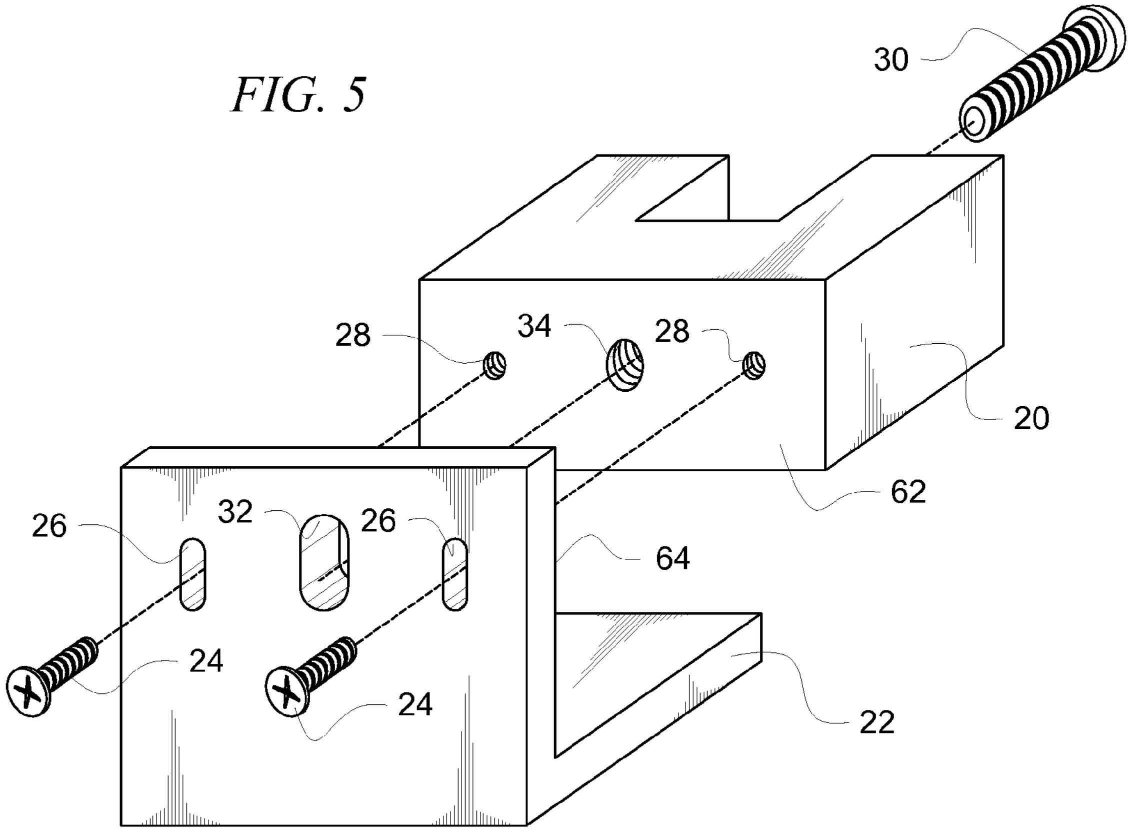
FIG. 5 illustrates an exploded view of an alternate support of the present invention.

Referring to FIG. 5, an exploded view of an alternate support of the present invention is shown. Shown is the base 22 with a relatively smooth surface 64 (without serrations) visible from the side only. The face 62 of the clamp 20 is also relatively smooth. Being that the base 22 and the face 62 of the clamp 20 are relatively smooth, friction between these two surfaces holds them in place with respect to each other. In some embodiments (not shown) these surfaces 62/64 can be textured or alternately, a gasket can be placed between them to hold the base 22 in place with respect to the clamp 20. The pressure screw 30 threads through threads 34 in the clamp 20 and passes through an elongated hole 32 in the base 22, thereby permitting the clamp 20 to move closer to the base 22 to tightly hold the planar material 40 (not shown). Likewise, clamp screws 24 pass through the elongated holes 26 in the base and into threaded holes 28 in the clamp. The clamp screws 24 hold the clamp 20 and base 22 in relative position after they are adjusted to the desired aperture size.

Figure 6:
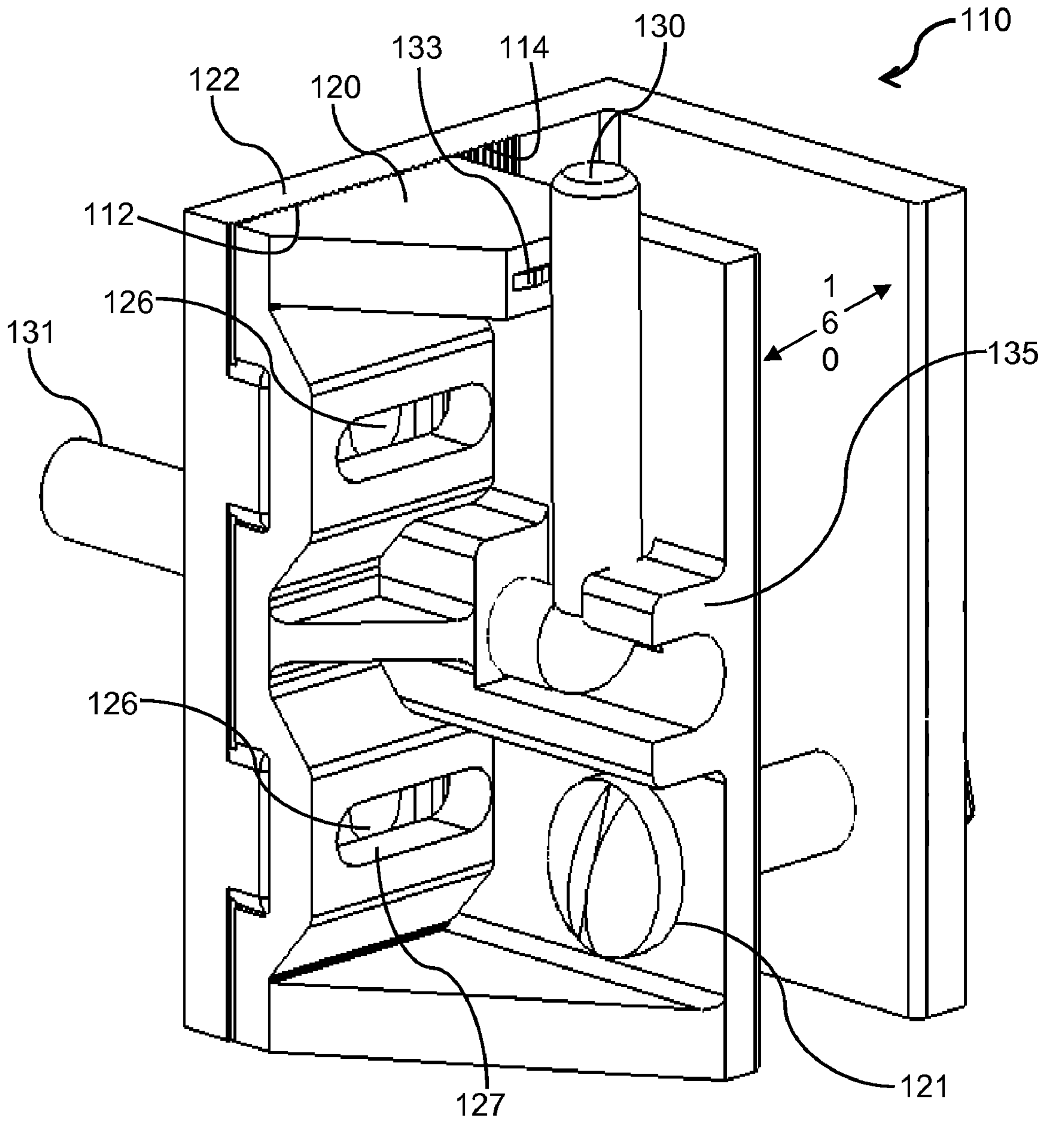
FIG. 6 illustrates a perspective view of a support of a second embodiment of the present invention.

Referring to FIG. 6, a perspective view of an adjustable support 110 of a second embodiment of the present invention is shown. An L-shaped base 122 and clamp 120 are configured to sandwich a planar sheet of material 40 (shown in FIG. 4) in an aperture 160. The base serrations 114 are angled toward the base 122 bottom while the clamp serrations 112 are angled away from the base 122 bottom, thereby engaging with each other to hold the clamp 120 in position with respect to the base 122 while inserting and tightening screws (as shown in FIG. 3) creating an aperture 160 of desired size. The locking pin 131 and locking pin handle 130 are shown in position of being engaged with the opposing support surfaces 47/48. To release the clip from the opposing support surfaces 47/48, the locking pin handle 130 is rotated 90 degrees past a detent 133 to a point where it clears the locking pin retainer 135, at which point it can be easily pulled to disengage from the hole in the opposing support surfaces 47/48. This locking mechanism is easier to operate during installation and removal since the locking mechanism of the prior embodiments require a screw driver held against the planar material 40 to turn the locking screw 30.

In some embodiments, a boss 126 is provided in the L-shaped base 122 and an elongated hole 127 in the clamp 120 to secure the clamp 120 to the L-shaped base 122 with screws (not shown).

In this embodiment of the present invention, holes are made in the opposing support surfaces 47/48 to accept the locking pin 131.

Figure 8:
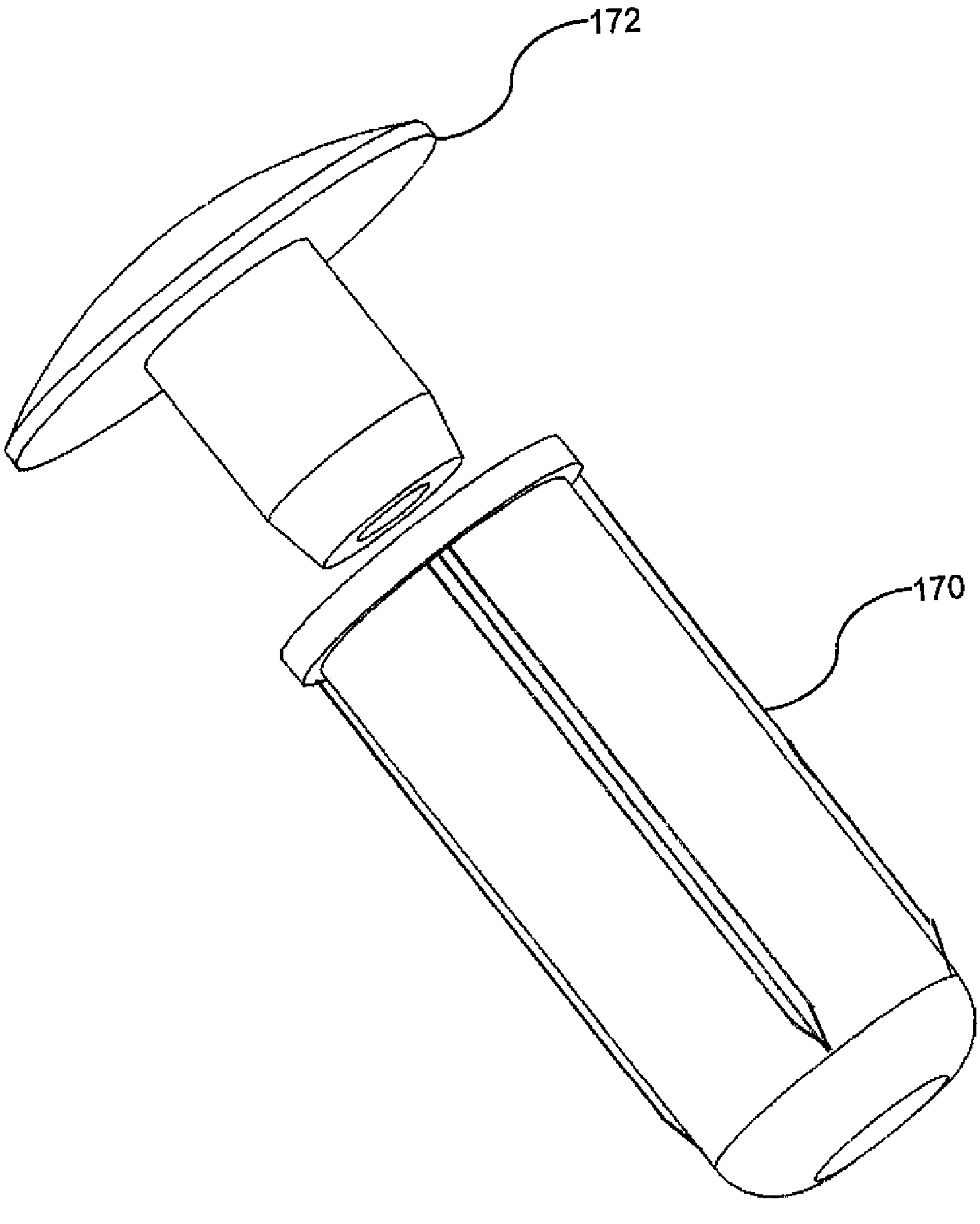
FIG. 8 illustrates a perspective view of a sleeve of the second embodiment of the present invention.

Referring to FIG. 8, a perspective view of a sleeve of the second embodiment of the present invention is shown. In some embodiments, a sleeve 170 is inserted into the holes in the opposing support surfaces for ascetic reasons and to reduce friction when inserting and removing the locking pin 131. In some embodiments, a cap 172 is provided to cover the open end of the sleeve 172 and in some embodiments the cap 172 is tethered to the sleeve 170 (tether not shown) and covers the holes when not in use for ascetic reasons and to keep debris out of the sleeve.

During installation, the locking pin handle 130 is positioned to an approximately 90 degree angle from the clamp 120, thereby clearing the locking pin retainer 135. Once the locking pin 131 is aligned with the hole in the opposing support surfaces, the locking pin 131 is pushed into the hole. To keep the locking pin 131 in place, the locking pin handle 130 is rotated approximately 90 degrees, passing a detent 133 that holds it against the clamp 120.

In some embodiments, a security screw 121 is used to keep the planar material from pulling out of the adjustable support 110 during high winds. The security screw 121 passes through the clamp 120, through a hole cut in the planar material 40 and through a hole in the L-shaped base 122, where it is held in place by a nut 123 (not visible in FIG. 6).

The L-shaped base 122 and clamp 120 are made from any sturdy material, preferably aluminum, steel, stainless steel, ultra-high molecular weight plastic (UHMW) or a structural plastic such as glass-filled polypropylene.

Figure 7:
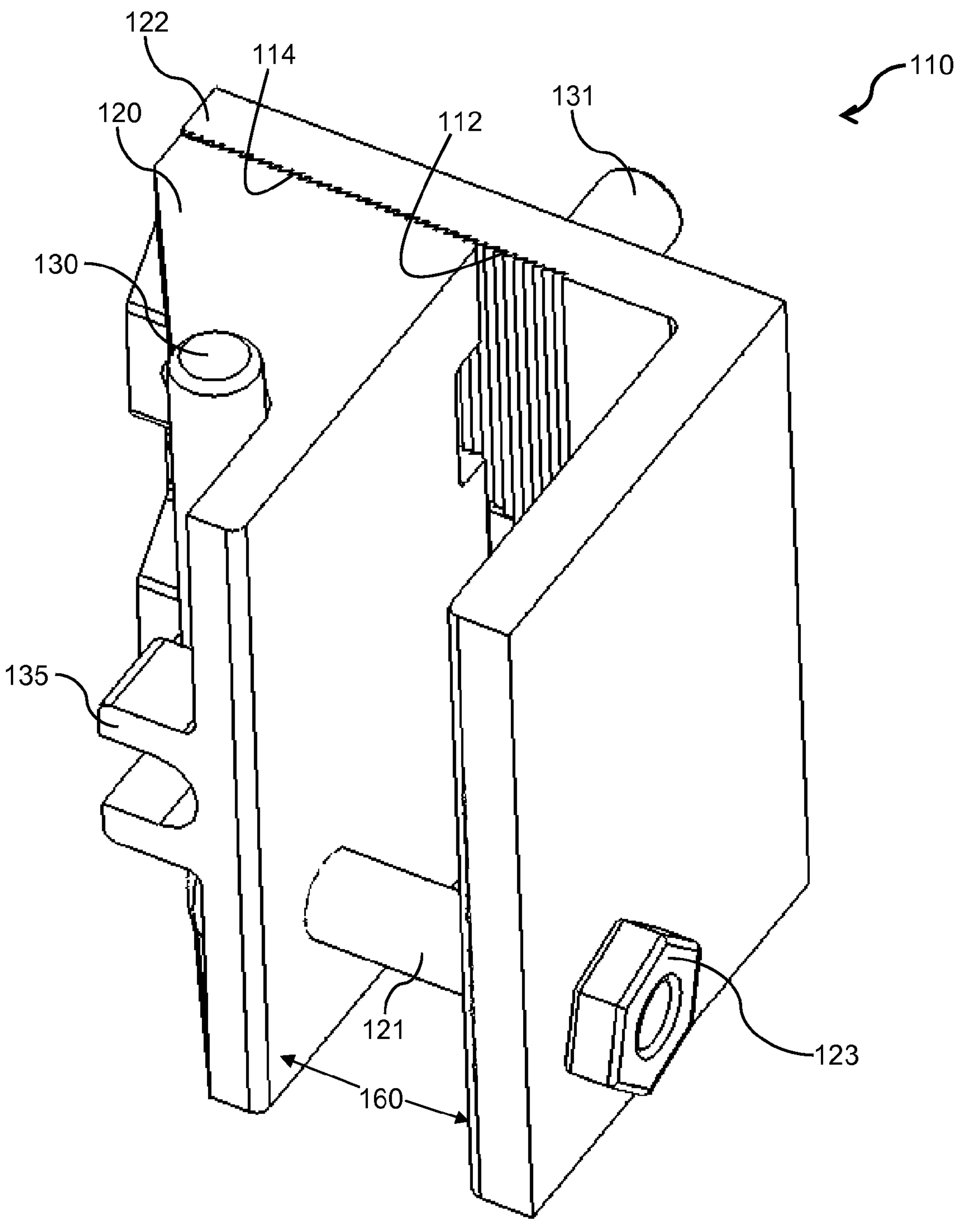
FIG. 7 illustrates a second perspective view of a support of the second embodiment of the present invention.

Referring to FIG. 7, a second perspective view of an adjustable support 110 of a second embodiment of the present invention is shown. An L-shaped base 122 and clamp 120 are configured to sandwich a planar sheet of material 40 (shown in FIG. 4) in an aperture 160. The base serrations 114 are angled toward the base 122 bottom while the clamp serrations 112 are angled away from the base 122 bottom, thereby engaging with each other to hold the clamp 120 in position with respect to the base 122 while inserting and tightening screws (as shown in FIG. 3) creating an aperture 160 of desired size. The locking pin 131 and locking pin handle 130 are shown in position of being engaged with the opposing support surfaces 47/48. To release the clip from the opposing support surfaces 47/48, the locking pin handle 130 is rotated 90 degrees to a point where it clears the locking pin retainer 135, at which point it can be easily pulled to disengage from the hole in the opposing support surfaces 47/48. This locking mechanism is easier to operate during installation and removal since the locking mechanism of the prior embodiments require a screw driver held against the planar material 40 to turn the locking screw 30. Once all adjustable supports 110 are disengaged, the planar material 40 is easily removed from the opposing support surfaces 47/48.

In this embodiment of the present invention, holes are made in the opposing support surfaces 47/48 to accept the locking pin 131. In some embodiments, a sleeve 170 (see FIG. 7) is inserted into the holes for ascetic reasons. In some embodiments, a cap 172 is provided to cover the holes in the opposing support surfaces when not in use for ascetic reasons and to keep debris out of the sleeve.

During installation, the locking pin handle 130 is positioned to an approximately 90 degree angle from the clamp 120, thereby clearing the locking pin retainer 135. Once the locking pin 131 is aligned with the hole in the opposing support surfaces, the locking pin 131 is pushed into the hole. To keep the locking pin 131 in place, the locking pin handle 130 is rotated approximately 90 degrees, passing a detent 133 that holds it against the clamp 120.

In some embodiments, a security screw 121 is used to keep the planar material from pulling out of the adjustable support 110 during high winds. The security screw 121 passes through the clamp 120, through a hole cut in the planar material 40 (shown in FIG. 4) and through a hole in the L-shaped base 122, where it is held in place by a nut 123.

The L-shaped base 122 and clamp 120 are made from any sturdy material, preferably aluminum, steel, stainless steel, ultra-high molecular weight plastic (UHMW) or a structural plastic such as glass-filled polypropylene.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. An adjustable support for mounting a substantially planar object between a first support surface and an opposed second support surface, the adjustable support comprising:

a substantially L-shaped base having a first side and a second side;

a clamp having a side surface and a bottom surface, the clamp being removably and adjustably attached to the first side of the L-shaped base, thereby forming an aperture between the second side of the L-shaped base and the bottom surface of the clamp, the aperture adjustable in width corresponding to a width of the substantially planar object; and a means for engaging the adjustable support passing through the clamp and passing through a hole in the first side of the L-shaped base, the means for engaging entering a hole in the first support surface when the means for engaging is in an extended position, thereby holding the substantially planar object between the first support surface and the opposed second support surface.

2. The adjustable support of claim 1, wherein the clamp is removably attached to the L-shaped base by a plurality of screws passing through an equal number of elongated holes in the side surface of the clamp and into threaded bosses in the first side of the L-shaped base.

3. The adjustable support of claim 1, further comprising a first set of serrated edges on an inside surface of the first side of the L-shaped base where the L-shaped base interfaces with the clamp and a second set of serrated edges on the side surface of the clamp where the clamp interfaces with the L-shaped base, the first set of serrated edges angled towards the aperture and the second set of serrated edges angled away from the aperture.

4. The adjustable support of claim 1, wherein the first support surface and the opposed second support surface have a plurality of holes and the means for engaging removably interfaces with one of the holes.

5. The adjustable support of claim 4, further comprising a plurality of sleeves, each sleeve positioned within one of the plurality of holes and the means for engaging removably interfacing with one of the sleeves.

6. The adjustable support of claim 5, further comprising a plurality of caps for removably covering the sleeves when the adjustable support is absent.

7. The adjustable support of claim 1, further comprising a security screw passing through the clamp and through a hole in the substantially planar object and through the L-shaped bracket and held in place by a nut.

8. An adjustable support for mounting a substantially planar object between substantially opposed support surfaces, the adjustable support comprising:

a substantially L-shaped base having a first side and a second side;

a clamp having a side surface and a bottom surface, the clamp being removably and adjustably attached to the first side of the L-shaped base forming an aperture between the second side of the L-shaped base and the bottom surface of the clamp, the aperture adjustable in width corresponding to a width of the substantially planar object; and a means for securing the adjustable support to the substantially opposed support surfaces, the means for securing passing through the clamp and passing through an elongated hole in the first side of the L-shaped base and into a hole in a first support surface thereby holding the substantially planar object between the first support surface and a second support surface when the means for securing is extended.

9. The adjustable support of claim 8, wherein the means for securing is a locking pin, the locking pin bent to form a handle portion and a locking pin portion, the locking pin portion removably engages with a hole in the first support surfaces.

10. The adjustable support of claim 9, further comprising a plurality of sleeves, each of the sleeves inserted into one of the holes in the support surfaces.

11. The adjustable support of claim 10, wherein the sleeves further comprise a removable cap for covering the holes when the adjustable clip is absent.

12. The adjustable support of claim 8, further comprising a first set of serrated edges on the first side of the L-shaped base where the L-shaped base interfaces with the clamp and a second set of serrated edge on the side surface of the clamp where the clamp interfaces with the L-shaped base, the first set of serrated edges angled towards the aperture and the second set of serrated edges angled away from the aperture.

* * * * *